United States Patent [19]

Stava

[11] Patent Number: 5,683,602
[45] Date of Patent: Nov. 4, 1997

[54] WELDING POWER SUPPLY

[75] Inventor: Elliott K. Stava, Sagamore Hills, Ohio

[73] Assignee: The Lincoln Electric Company, Cleveland, Ohio

[21] Appl. No.: 664,851

[22] Filed: Jun. 17, 1996

[51] Int. Cl.$^6$ .................................................. B23K 9/09
[52] U.S. Cl. .......................... 219/137 PS; 219/130.32; 219/130.51
[58] Field of Search .................... 219/137 PS, 130.32, 219/130.4, 130.5, 130.51

[56] References Cited

U.S. PATENT DOCUMENTS

| | | |
|---|---|---|
| 4,038,515 | 7/1977 | Risberg . |
| 4,310,744 | 1/1982 | Okada .................. 219/130.32 |
| 4,371,776 | 2/1983 | Winn . |
| 5,338,916 | 8/1994 | Blankenship et al. .......... 219/130.4 |

*Primary Examiner*—Clifford C. Shaw
*Attorney, Agent, or Firm*—Vickers, Daniels & Young

[57] ABSTRACT

A power supply for supplying a substantially square wave of current to a welding arc and including a source of A.C. power having a succession of positive and negative portions forming an input voltage cycle; first switch means for initiating a positive output current pulse at a selected first switching point during the positive portion of the input voltage cycle; second switch means for initiating a negative output current pulse at a selected second switching point during the negative portion of the input voltage cycle; means for sensing the output current through the arc; means responsive to the output current for creating a command signal as a voltage level which varies according to the desired instantaneous output current through the arc; and, control means for automatically selecting the first and second switching points in response to the voltage level. The control means comprises a first circuit for creating a first voltage ramp signal, a second circuit for creating a second voltage ramp signal with the voltage ramp signals having generally the same final voltage but different slopes. The ramp signals as they are being created are compared with the voltage level. The comparing means creating the first switching signal when the first ramp signal progresses to the voltage level and creating the second switching signal when the second ramp signal progresses to the voltage level, whereby the current pulses are automatically unbalanced at high selected output current and progressively approaches balanced as the selected output current decreases.

24 Claims, 4 Drawing Sheets

WELDING POWER SUPPLY

The present invention relates to the art of power supplies for arc welding and more particularly to a power supply driven by a single phase A.C. electrical power source for creating a square wave output welding current of the type particularly applicable for A.C. TIG welding of aluminum, aluminum alloys and similar metals. Such A.C. welders operate in accordance with a process parameter, such as a selected desired output current to create an output welding current constituted by a first polarity current pulse, defining a clean portion, and a second polarity current pulse, defining a weld portion, wherein the clean portion and weld portion alternate in a manner to optimize the cleaning action and the penetration or welding action of the output current.

BACKGROUND OF INVENTION

The present invention relates to a control arrangement and method for controlling the balance between the clean cycle and the weld cycle in an A.C. TIG welder of the type having a generally square wave current output at least above a threshold output current level. Such square wave A.C. TIG welders are well known in the field. Many years ago square wave A.C. output current for TIG welding aluminum was modified by a process wherein the clean portion of the alternating current cycle was controlled to have a time duration only as long as is necessary for effecting the cleaning of the workpiece being welded. In these early power supplies, the A.C. output current was obtained by switching a constant D.C. current supply between a positive polarity and a negative polarity through the use of switching devices, such as SCRs. In this manner, the square wave output was switched between a positive polarity clean current pulse and a negative polarity weld current pulse. Both of these current pulses were independently adjusted in duration, or length of time, by selecting the switching points of the polarity changing SCRs. Thus, TIG welding of aluminum by a method that adjusted the duration of the clean pulse and/or the weld pulse in an alternating current mode of operation has been known for many years. The early power supplies for switching D.C. current in an unbalanced manner to produce a different positive polarity clean pulse and a negative polarity weld pulse were somewhat expensive and required full wave rectifiers to produce the constant D.C. current that was switched between positive and negative polarities. To simplify this process, A.C. TIG welders were designed with single phase alternating current input voltage controlled by a switching network with switching points for both the positive and negative portions of the input alternating voltage. Successive switching during alternate half cycles would cause a current reversal by the power supply during both the positive and negative portions or half cycles of the input voltage. In this manner, an A.C. output current was created. With the use of a large inductor, this output current had a desirable square wave profile, above the minimum or threshold output current. To unbalance the positive output current pulse and the negative output current pulse, the switching means were controlled to switch at a different phase position or desired time in the input cycle. This technology has been well known for several years; however, the amount of unbalanced output square wave current was at a fixed relationship. When the output current was increased by retarding the firing points, or locations of current reversal, the same unbalanced relationship was maintained. It is more desirable to have a different relationship, or percentage of time, between the clean pulse and the weld pulse in a square wave TIG welder at lower output currents than at higher output currents. At low currents the pulses should be near balanced, while at high currents unbalance is desired. Such adjustment in the unbalanced condition of the output current was not obtainable in the prior art welders until the introduction by The Lincoln Electric Company of Cleveland, Ohio of a microprocessor control for selection of the firing points. Such microprocessor control is successful in adjusting the balancing relationship as a function of output current; however, this prior square wave power supply had to be provided with a microprocessor which is not always feasible. Thus, without the use of a microprocessor A.C. TIG welders of the square wave alternating current type have required the use of fixed unbalanced relationship, irrespective of the output current. Thus, there is a need for an A.C. TIG welder of the square wave type which will automatically adjust the unbalanced condition between the clean cycle and the weld cycle as the desired output current changes.

INCORPORATION BY REFERENCE

To avoid a detailed analysis of the well known operating characteristics of the power supply to which the present invention is directed, Risberg U.S. Pat. No. 4,038,515 and Winn U.S. Pat. No. 4,371,776 are incorporated by reference herein. Risberg illustrates a full bridge employing SCRs to convert a single phase input voltage into a square wave A.C. welding current, wherein the time duration of the clean pulse of the input cycle can be adjusted by changing the phase relationship of firing points or gating times of the SCRs. These SCRs control two separate current paths through a common current stabilizing choke. The clean pulse, or portion, and weld pulse, or portion, in this prior art patent, when operated in a square wave mode above a given current, are summed together to equal 360 electrical degrees. Consequently, the power supply is not as precisely adjustable as the early D.C. switched power supplies, but the welder does produce a generally square wave current output that has an adjustable balance. This welder has a clean current pulse that is adjustable in percentage of balance by manual manipulation, but the percentage balance over the complete output current spectrum is generally fixed. Winn U.S. Pat. No. 4,371,776 also discloses a square wave A.C. TIG welder employing forced commutating SCRs in a power circuit of the type including a two SCR bridge, or a four SCR bridge as illustrated in Risberg U.S. Pat. No. 4,038,515. Both Winn and Risberg teach the TIG welding technology which allows adjustment of the clean pulse in an A.C. TIG welder for aluminum. This balance adjustment is, however, manual and fixed irrespective of the output current of the power supply. These two prior art patents disclose the general power supply to which the present invention is directed so that there is no need for further discussion of the operating characteristics of such square wave A.C. power supplies for use in TIG welding.

THE INVENTION

The present invention relates to an A.C. square wave TIG welder having a single phase input voltage source with successive positive and negative voltage half cycles forming the input voltage cycle, as illustrated in the patents incorporated by reference herein. In accordance with the present invention, there is provided a first switching means for initiating a positive output current pulse at a selected first switching point during the positive portion of the input voltage and a second switching means for initiating a negative output current pulse at a selected second switching point during the negative portion of the input voltage. The switching means are normally SCRs with gates to receive a firing signal or a gating signal to reverse the polarity of the output current during a given half cycle of the A.C. input voltage. In accordance with the preferred embodiment of the invention a choke is employed for maintaining the output current in one polarity until it is switched into the other polarity. In a power supply of this type, high current is obtained by firing or gating the SCRs of the first and second switching means very early in the half cycles of the input voltage. To obtain less output current, the firing points are delayed causing less of the input voltage cycle to be used to create the output current. By delaying the firing points or gating signals in the power supply, the output current is decreased. In a balanced square wave A.C. power supply, the firing points for both polarities of the input voltage are at the same time based relationship or same phase. They are delayed in unison to maintain a balanced output square wave. In accordance with the background and prior art of the present invention, output current of the power supply is unbalanced to produce a positive clean pulse having a width different than the negative weld pulse. This is accomplished by manually shifting the phase relationship of the firing points in the two half cycles. However, this phase relationship is the same as the current is decreased by delaying both firing points in unison to create the output current pulses. In accordance with the present invention, this same type of current regulating mechanism is employed wherein the output current through the arc is sensed and used to create a voltage level or command signal which varies according to the desired instantaneous current through the arc. A control means is employed for automatically selecting the first and second switching points in response to the voltage level or command signal. Such arrangement delays the firing points as the demand for output current is decreased.

In the prior art, the unbalanced relationship remained substantially constant. For that reason, balance or unbalance relationship of the output current was optimized for only one of the output currents. The unbalance percentage was not the optimum for different output currents. This is a disadvantage of the prior art to which the present invention is directed, which disadvantage has been addressed effectively only by a prior invention wherein a microprocessor is employed for the purposes of changing the balance as the desired output current changes. In accordance with the present invention, there is provided a simple, inexpensive arrangement for accomplishing the advantages of the expensive, complicated and often unavailable microprocessor control concept. In accordance with the invention, the control arrangement for automatically selecting the first and second switching points comprises a first circuit for creating a first voltage ramp signal and a second circuit for creating a second voltage ramp signal. Then the two ramp signals have generally the same final voltage, but different slopes. By comparing these ramp signals with the voltage level indicative of the desired output current, the first switching signal is created when the first ramp signal progresses to the voltage level during the positive half cycle of the input voltage. The second switching signal is created when the second ramp signal progresses to the voltage level indicative of the desired output current. In this manner, at high current levels, there is a substantial unbalance, which unbalance is gradually reduced as the desired output current is decreased. Consequently, at high current levels, the clean portion or pulse of the square wave output signal is relatively small with respect to the weld portion or pulse of the output signal. By using the present invention, a relatively simple arrangement is provided for automatically changing the balance or unbalance of the square wave A.C. TIG welder in accordance with the desired output current being created in response to the current regulator for a square wave welder.

The primary object of the present invention is to provide a square wave power supply for A.C. TIG welding which automatically adjusts the balance between the clean cycle and the weld cycle in accordance with the desired output current.

Yet another object of the present invention is the provision of an A.C. TIG welder, as defined above, which A.C. TIG welder creates an output square wave current that is substantially unbalanced at high output currents and approaches a balanced operation by decreasing the output current.

Another object of the present invention is the provision of a method for supplying a substantially square wave current to a welding arc, which method automatically decreases the amount of unbalance as the desired output current decreases without the need for a microprocessor or other software driven control architecture.

These and other objects and advantages will become apparent from the following description taken together with the accompanying drawings.

PREFERRED EMBODIMENT

Figure 1:
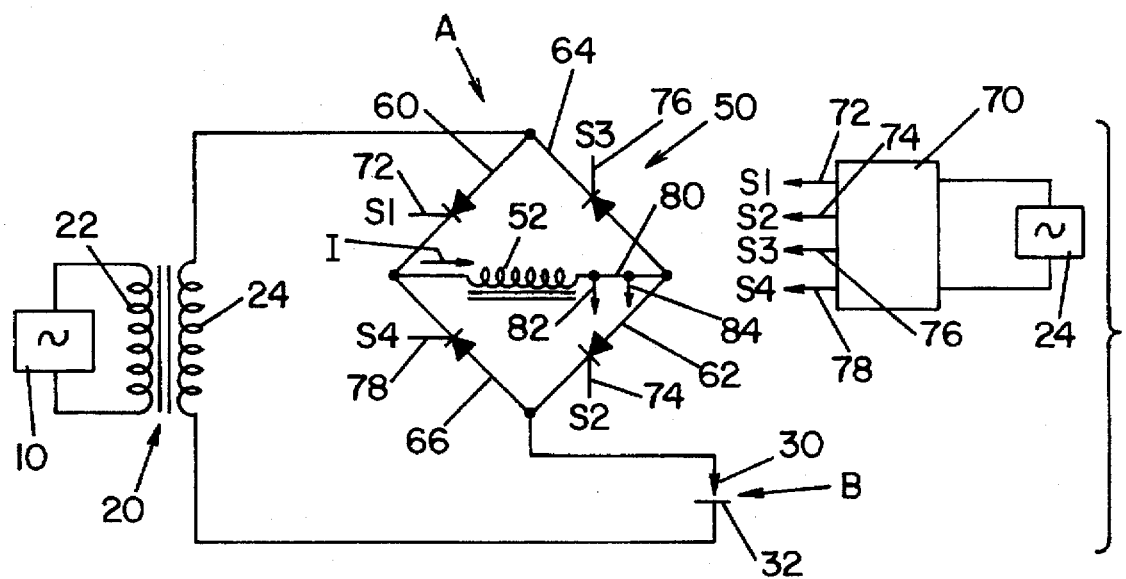
FIG. 1 is a schematic circuit diagram of a welding power supply of the type to which the present invention is directed.

Referring now to the drawings, wherein the showings are for the purpose of illustrating the preferred embodiment of the invention only, and not for the purpose of limiting same, FIG. 1 shows a power supply A of the general type illustrated in prior patents and which is the architecture used in the preferred embodiment of the present invention. Power supply A includes an A.C. voltage source 10 for driving transformer 20, having a primary 22 and a secondary 24. The output of the secondary is a single phase alternating voltage for creating a square wave current through welding arc B, illustrated schematically as an electrode 30 and workpiece 32. In series with the arc B and secondary 24 is a controlled bridge 50, having SCRs S1, S2, S3 and S4 for controlling the current flow in two opposite polarity current paths, both of which pass through the relatively large inductor 52 in the same direction between the direct current terminals of bridge 50. The first electrical current path includes legs 60, 62 so that when SCRs S1 and S2 are in conduction, initially caused by gating signals on these SCRs, positive current flows through leg 60, through inductor 52 and then through leg 62. This is the positive current pulse when the electrode 30 is positive, which is referred to as the first polarity or clean portion or pulse of the output current. A second electrical current path through bridge 50 includes legs 64, 66 rendered conductive by SCRs S3 and S4. When current flows in this second path, the electrode is negative, which is referred to as the straight polarity, the weld pulse or the penetration portion of the TIG cycle. A firing control circuit 70 creates gating signals or pulses in gates 72, 74, 76 and 78 by the circuits of FIGS. 2-5 for rendering conductive SCRs S1, S2, S3 and S4, respectively. The firing circuit 70 is synchronized by secondary 24. As discussed in the prior art and in the introductory portion of this application, during the positive half cycle SCRs S1 and S2 are rendered conductive. This causes a current reversal through arc B to initiate a clean pulse. At a desired time, during the negative half cycle of the voltage from secondary 24, gating pulses in lines 76, 78 reverse the current flow through arc B to start the weld or penetration portion of the square wave. The invention is described with respect to a square wave A.C. output current; however, such a current requires at least a minimum output current level so that the current is maintained in inductor 52 until there is a reversal of the polarity of the current through arc B. This square wave condition based upon the necessary inductance of choke 50 is assumed since normal operation of a TIG welder involves current flow above the square wave threshold current. To measure the arc current from power supply A, various arrangements could be employed, such as a Hall generator or a shunt, which is illustrated in FIG. 1. Shunt 80 creates a voltage level across lines 82, 84, which voltage level is indicative of the actual current from power supply A. In practice, line 84 is circuit common or ground.

Figure 2:
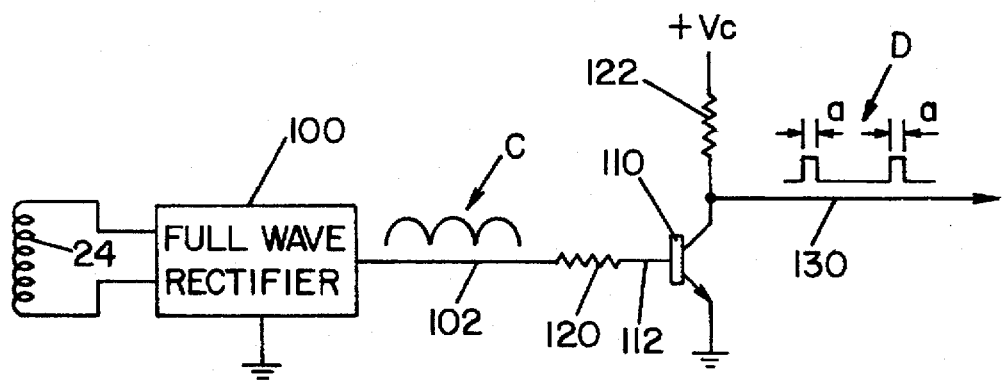
FIG. 2 is a schematic wiring diagram of the circuit for creating a wave having a delay pulse at the start of the negative and positive half cycles of the input voltage.
Figure 2A:
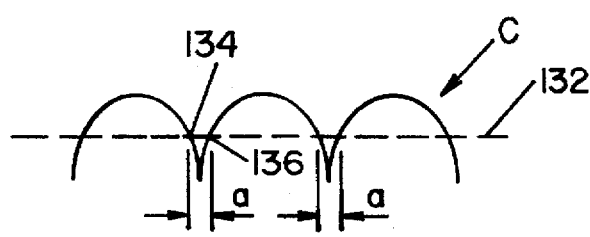
FIG. 2A is a wave form illustrating the operating characteristics of the circuit illustrated in FIG. 2.
Figure 3:
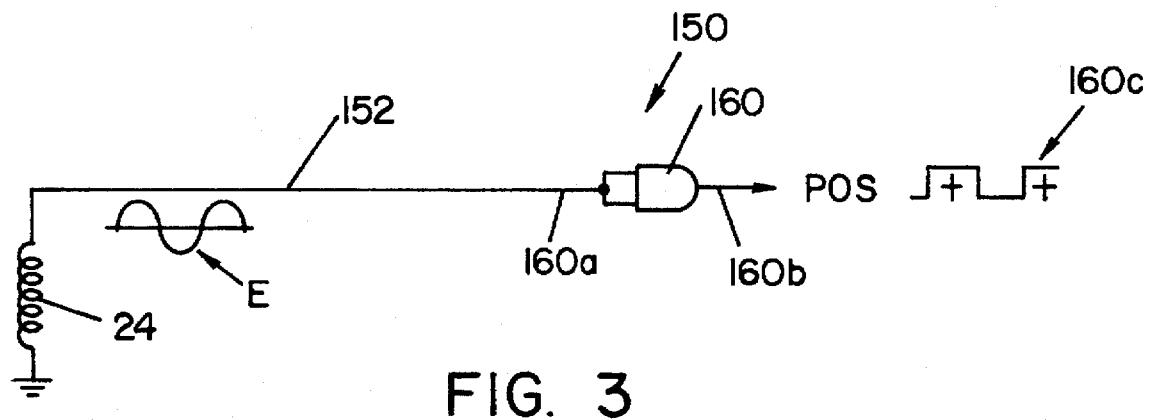
FIG. 3 is a schematic wiring diagram of the circuit for creating the phase discrimination signal employed in the preferred embodiment of the present invention, together with a wave shape showing the positive and negative phase control signals from this circuit.
Figure 4:
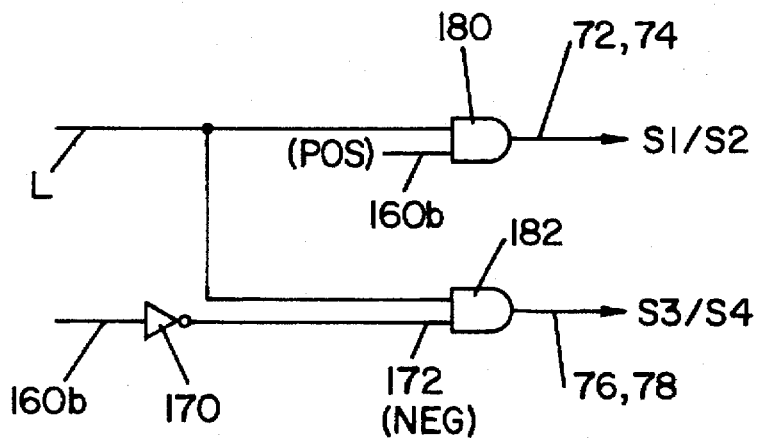
FIG. 4 is a logic diagram illustrating the circuits to create the firing signals S1, S2, S3 and S4 for the positive and negative portions of the input voltage to gate between clean and weld output current pulses.

In accordance with the present invention, output ramp logic shapes are generated each half cycle for comparison with a current command signal, in the form of a voltage level, to select the firing points where the current is to be reversed through arc B. In the illustrated embodiment of the invention, an initial voltage delay is created at the beginning of each half cycle of the sine wave in secondary 24. The delay curve, or wave form D, is shown in FIG. 2 and is created by a full wave rectifier 100 having an output wave form C on output 102. This wave form controls the conduction of transistor 110, having a base 112. Resistor 120 is in output 102 for applying the full rectified wave form C to base 112 of transistor 110. Resistor 122 is connected between the control voltage Vc and transistor 110 to create the output wave form D in output line 130. Referring to FIG. 2A, wave form C is superimposed on line 132, which is the conduction voltage for transistor 110. When wave form C is below voltage 132 transistor 110 is turned OFF. When the voltage of wave form C increases above voltage 132, transistor 110 begins to conduct. The intersections points 134, 136 define the short delay a, which delay is the width of the pulses in curve or wave form D. Wave form D has pulses which occur at the start of each half cycle of the input voltage at secondary 24. This same input voltage is applied to the phase discrimination circuit 150 schematically illustrated in FIG. 3. A sine wave E at input 152 controls AND gate 160 having input 160a and output 160b. The voltage on output 160b is logic 1 when the input voltage is positive. Thus, a logic 1 in output 160b indicates a positive half cycle of the input voltage. In a like manner, a logic 0 in output 160b indicates a negative half cycle of the input voltage. The output of gate 160 and wave form D are used to create the firing signal L, which signal is the input of a logic network including AND gates 180, 182 and illustrated in FIG. 4. When a logic 1 appears in output 160b, a firing or gate signal L creates a gate signal in lines 72, 74 for the purpose of switching bridge 50 to the first current direction. In a like manner, a firing or gate signal L occurring with a logic 0 in line 160b, causes the gate signal in lines 76, 78 for initiating the opposite polarity current flow through bridge 50 by creating a logic 1 in output 172 of inverter 170. The present invention relates to the circuitry and concept employed for creating the firing signal L to control the logic network shown in FIG. 4 by using the wave forms and concepts of the circuits illustrated in FIGS. 2 and 3.

Figure 5:
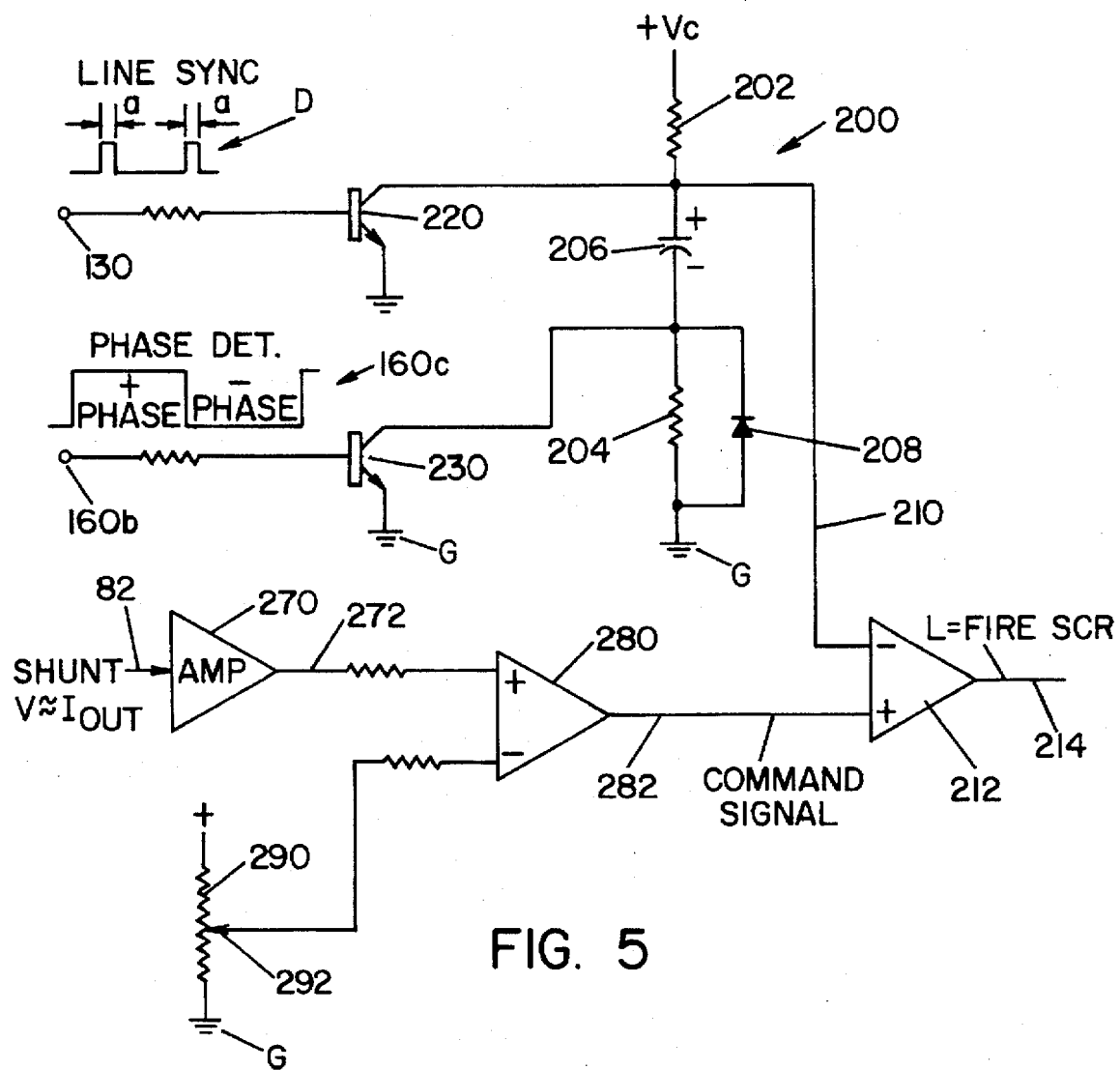
FIG. 5 is a schematic wiring diagram illustrating the preferred embodiment of the present invention for creating firing or gating signal L to be used as an input to the logic diagram of FIG. 4 to control the power supply schematically illustrated in FIG. 1.

The control mechanism for creating the gating pulses or gate signals in lines 72-78 is schematically illustrated in FIG. 5, wherein the control mechanism, or circuit, includes a branch 200 with resistors 202, 204 and capacitor 206 in series between control voltage Vc and ground G. Diode 208 allows rapid discharge of capacitor 206 when transistor 220 is conducting. Branch 200 has an output 210 directed to one input of comparator 212 which comparator employs two ramp generators or circuits and operates in accordance with the center wave form 210a shown in FIG. 6. Output 210 is instantaneously shifted to a zero voltage or ground G by conduction of transistor 220 controlled by the series of pulses in wave form D on line 130. A pulse in wave form D on line 130 shifts output 210 to a zero logic through transistor 220 to ground G. Thus, as shown in the center wave form of FIG. 6, the start of each half cycle for the wave form in 210, i.e. wave form 210a, is a zero voltage for the time delay a, which delay is the width of the pulses in wave form D. The wave form 210a basically follows capacitor 206, which has a voltage controlled by operation of transistor 230 through the pulse or logic in output line 160b from FIG. 3. Referring now to the voltage curve or wave form 210a indicating the voltage on line 210, as shown in the center wave form of FIG. 6, during the positive half cycle 240, a logic 1 appears in output 160b. The voltage on output 160b is shown in the second wave form 160c of FIG. 6. During this positive half cycle, designated as 240 in FIG. 6, there is a zero voltage section 242 at the start of the positive half cycle 240. During this delay time, transistor 220 is conducting to clamp line 210 to zero voltage. After delay time a, transistor 220 no longer conducts. Then, capacitor 206 charges through resistor 202 through transistor 230 which is conducting due to the logic 1, or positive voltage, on line 160b, as shown in wave form 160c in FIG. 6. Ramp 244 of the voltage wave form 210a is generated on line 210. This voltage ramp progresses upwardly toward maximum voltage 246, which is shown in wave form 210a and is determined by the input or control voltage Vc on resistor 202. The rate of increase of voltage of created ramp 244 is controlled by resistor 202 and capacitor 206 forming the time constant for the slope of the charging ramp 244. At the top of voltage ramp 244, line 210 is immediately shifted to a zero voltage by a pulse in wave form D. This then initiates the negative portion 250 of the graphs shown in FIG. 6. During this negative portion 250 the base of transistor 230 is at a logic 0, as shown by wave form 160c in FIG. 6. Transistor 230 is not conducting when the base at a logic 0;

therefore, when transistors 220 releases line 210, after a time delay a, the voltage on line 210 immediately shifts or jumps upwardly as indicated by step 254 in wave form 210a. This step is illustrated as voltage b. The, voltage step or jump is created by charging capacitor 206 through resistors 202, 204 when transistor 220 is non-conductive. As soon as the clamp of transistor 220 is removed from line 210, the voltage on this line immediately jumps to the voltage on the bottom of resistor 202, which is in a voltage divider not grounded by transistor 230. This voltage step is the initial voltage 258 for created voltage ramp 256, which voltage ramp progresses from voltage at point 258, created by step 256, to voltage 246. Thus, the created voltage ramp 256 during the positive portion 250 of the wave forms is relatively high immediately after a pulse in wave form D. This high starting voltage causes a different slope for the voltage ramp 256, as shown in the middle graph of wave form 210a of FIG. 6. To create the firing or gating signal L, comparator 212 has a positive terminal controlled by the voltage on line 282 from current regulator 280. Current regulator 280 receives a voltage signal from amplifier 270 which amplifies the sensed voltage indicative of the actual output current of the power supply. The voltage indicative of the output current appears on line 272, which line is connected to the positive terminal of current regulator 280. The other terminal of regulator 280 is the manually adjusted, output current setting represented by the voltage from potentiometer 290 having a movable contact 292. The voltage of contact 292 is applied to the negative input of current regulator 280. The voltage on output 282 is the voltage level indicative of the desired current to be created by the power supply.

Figure 6:
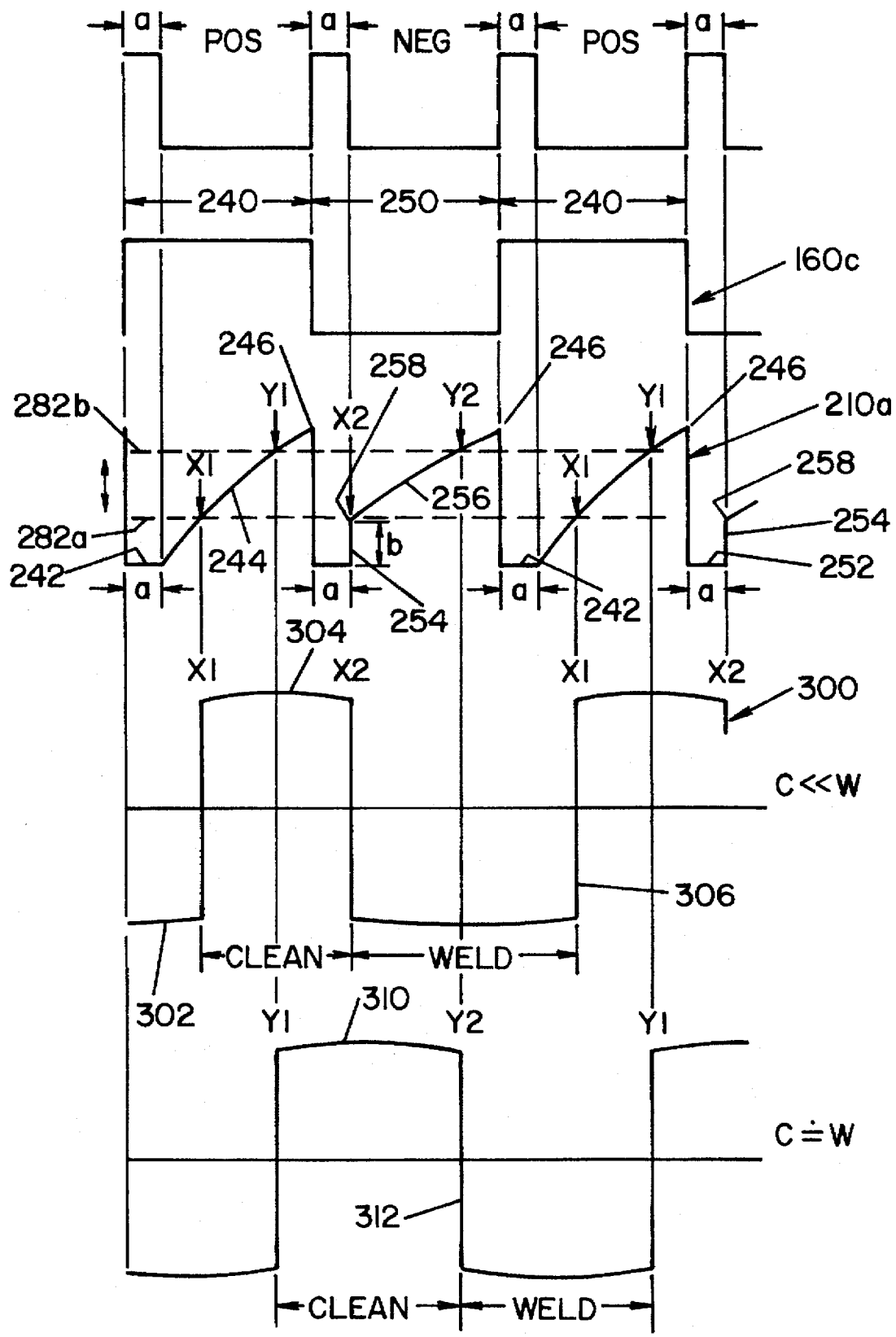

Referring again to wave form 210a with created voltage ramps 244, 256, a firing signal L is created in output 214 of comparator 212 based upon the level or amount of voltage on line 282. This voltage is shown in FIG. 6 as voltage 282a for a high current level and voltage 282b for a low current level. Referring now to the high output level indicated by a low voltage 282a on line 282, as the voltage ramp 244 increases during the positive half cycle 240, there is a voltage intersection at point X1. This intersection causes comparator 212 to create a firing signal L in line 214. The output current is illustrated in FIG. 6 as wave form 300 which shifts from a weld pulse 302 to a clean pulse at firing point X1. Continuing along voltage line 282a to negative portion 250 of FIG. 6, there is an immediate intersection between voltage ramp 256 and high current voltage line 282a after the voltage step 258. Thus, a firing signal L is created in output 214 immediately after the zero voltage portion 252 of wave form 210a. At this firing point X2, the output current shifts from positive clean pulse 304 to negative weld pulse or penetration pulse 306. Since the high current voltage level 282a is low, there is a substantial unbalance between the width of clean pulse 304 and the width of the weld pulse 306 in the output current of power supply A. As the desired output current decreases, the voltage on line 282 increases. This high level voltage in output 282 is indicated by voltage line 282b. As voltage ramp 244 increases in positive portion 240 the ramp signal intersects voltage 282b at firing point Y1 creating a clean pulse 310 at that time. In a like manner, voltage 282b is intersected by ramp 256 during the negative portion 250 of FIG. 6. This intersection creates a firing signal L in output 214 to immediately reverse the polarity of the output current to shift from clean pulse 310 to weld pulse 312 at firing point Y2. As can be seen, as the voltage on line 282 increases as the desired output current decreases, the amount of unbalance between the clean and weld pulses is automatically reduced. At the upper portions of increasing voltage ramps 244, 256, there is a substantial balance between the clean pulse and weld pulse. Thus, the present invention automatically adjusts the balance according to the desired output current from the current regulator of the square wave power supply.

Figure 5A:
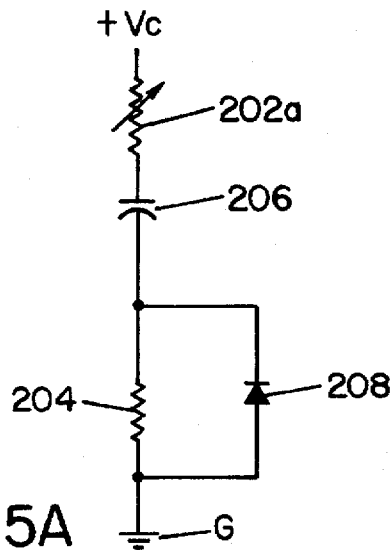
FIG. 5A is a partial wiring diagram illustrating a modification of the preferred embodiment of the present invention, as shown in FIG. 5; and, FIG. 6 is a series of wave forms illustrating the operating characteristics of the preferred embodiment of the present invention, as illustrated in FIG. 5.

Referring now to FIG. 5A, the value b of the voltage jump at step 254 can be adjusted by using a variable resistor 202a, instead of a fixed resistor 202. Of course, other modifications could be used for adjusting the immediate increase or jump in voltage to control the difference between the increasing voltage of ramp 244 and the increasing voltage of ramp 256.

Having thus defined the invention, the following is claimed:

1. A power supply for supplying a substantially square wave of current to a welding arc, said power supply comprising: a source of A.C. power having successive of positive and negative voltage portions forming an input voltage cycle; a circuit connected in series between said source and said arc and including alternatively conducting first and second current paths for supplying current in respective opposite and mutually exclusive polarities to said arc; inductor means connected in said current paths, such that the arc current supplied from said source flows in the same direction in series through said inductor means irrespective of the polarity of the arc current; first switch means for rendering said first current path conducive at a first switching point during said positive portion of said cycle to create a positive output current pulse; second switching means for rendering said second current path conductive at a second switching point during said negative portion of said cycle to create a negative current pulse; means for sensing the output current through said arc; means responsive to said output current for creating a command signal as a voltage level which varies according to the desired instantaneous output current through said arc; and, control means for automatically selecting said first and second switching points in response to said voltage level, said control means comprising a first circuit for creating a first voltage ramp signal, a second circuit for creating a second voltage ramp signal, said voltage ramp signals having generally the same final voltage and different slopes, and means for comparing said ramp signals with said voltage level, said comparing means creating said first switching signal when said first ramp signal progresses to said voltage level and creating said second switching signal when said second ramp signal progresses to said voltage level, whereby said current pulses are automatically unbalanced at higher selected output currents and progressively approaches balanced as said selected output current decreases.

2. A power supply as defined in claim 1 wherein said voltage ramp signals increase toward a given voltage.

3. A power supply as defined in claim 2 wherein said voltage level decreases as the desired output current increases.

4. A power supply as defined in claim 1 wherein said voltage level decreases as the desired output current increases.

5. A power supply as defined in claim 1 wherein said voltage ramp signals start after a given time delay in said positive and negative portions of said input voltage cycle.

6. A power supply as defined in claim 5 wherein said first voltage ramp signal starts at a first voltage level and said second voltage ramp signal starts at a second voltage level, with said second voltage level being greater than said first voltage level.

7. A power supply as defined in claim 6 wherein said first voltage ramp signal has a first time constant curve and said second voltage ramp signal has a second time constant curve, with said first time constant curve being more steep than said second time constant curve.

8. A power supply as defined in claim 7 wherein said voltage ramp signals increase toward a given voltage.

9. A power supply as defined in claim 1 wherein said first voltage ramp signal starts at a first voltage level and said second voltage ramp signal starts at a second voltage level, with said second voltage level being greater than said first voltage level.

10. A power supply as defined in claim 9 wherein said first voltage ramp signal has a first time constant curve and said second voltage ramp signal has a second time constant curve, with said first time constant curve being more steep than said second time constant curve.

11. A power supply as defined in claim 1 wherein said first voltage ramp signal has a first time constant curve and said second voltage ramp signal has a second time constant curve, with said first time constant curve being more steep than said second time constant curve.

12. A method for supplying a substantially square wave of current to a welding arc, said method comprising the steps of:

(a) providing a source of A.C. power having successive of positive and negative voltage portions forming an input voltage cycle;

(b) providing a circuit connected in series between said source and said arc and including alternately conducting first and second current paths for supplying current in respective opposite and mutually exclusive polarities to said arc;

(c) providing an inductor means connected in said current paths, such that the arc current supplied from said source flows in the same direction in series through said inductor means irrespective of the polarity of the arc current;

(d) rendering said first current path conducive at a first switching point during said positive portion of said cycle to create a positive output current pulse;

(e) rendering said second current path conductive at a second switching point during said negative portion of said cycle to create a negative current pulse;

(f) sensing the output current through said arc, (g) creating a command signal as a voltage level which varies according to the desired instantaneous output current through said arc; and, (h) automatically selecting said first and second switching points in response to said voltage level by creating a first voltage ramp signal, a second voltage ramp signal, said voltage ramp signals having generally the same final voltage and different slopes, and comparing said ramp signals with said voltage level to create said first switching signal when said first ramp signal progresses to said voltage level and then create said second switching signal when said second ramp signal progresses to said voltage level, whereby said current pulses are automatically unbalanced at higher selected output currents and progressively approaches balanced as said selected output current decreases.

13. A method as defined in claim 12 wherein said voltage ramp signals increase toward a given voltage.

14. A method as defined in claim 12 wherein said voltage level decreases as said desired output current increases.

15. A method as defined in claim 12 wherein said voltage ramp signals start after a given time delay in said positive and negative portions of said input voltage cycle.

16. A method as defined in claim 15 wherein said first voltage ramp signal starts at a first voltage level and said second voltage ramp signal starts at a second voltage level, with said second voltage level being greater than said first voltage level.

17. A method as defined in claim 12 wherein said first voltage ramp signal has a first time constant curve and said second voltage ramp signal has a second time constant curve, with said first time constant curve being more steep than said second time constant curve.

18. A method as defined in claim 12 wherein said first voltage ramp signal starts at a first voltage level and said second voltage ramp signal starts at a second voltage level, with said second voltage level being greater than said first voltage level.

19. In a power supply for supplying a substantially square wave of current to a welding arc, said power supply comprising: a source of A.C. power having a succession of positive and negative portions forming an input voltage cycle; first switch means for initiating a positive output current pulse at a selected first switching point during said positive portion of said input voltage cycle; second switch means for initiating a negative output current pulse at a selected second switching point during said negative portion of said input voltage cycle; means for sensing the output current through said arc; means responsive to said output current for creating a command signal as a voltage level which varies according to the desired instantaneous output current through said arc; and, control means for automatically selecting said first and second switching points in response to said voltage level, said control means comprising a first circuit for creating a first voltage ramp signal, a second circuit for creating a second voltage ramp signal, said voltage ramp signals having generally the same final voltage and different slopes and means for comparing said ramp signals with said voltage level, said comparing means creating said first switching signal when said first ramp signal progresses to said voltage level and creating said second switching signal when said second ramp signal progresses to said voltage level, whereby said current pulses are automatically unbalanced at high selected output current and progressively approaches balanced as said selected output current decreases.

20. A power supply as defined in claim 19 wherein said voltage ramp signals increase toward a given voltage.

21. A power supply as defined in claim 19 wherein said voltage level decreases as the desired output current increases.

22. A power supply as defined in claim 19 wherein said voltage ramp signals start after a given time delay in said positive and negative portions of said input voltage cycle.

23. A power supply as defined in claim 19 wherein said first voltage ramp signal starts at a first voltage level and said second voltage ramp signal starts at a second voltage level, with said second voltage level being greater than said first voltage level.

24. A power supply as defined in claim 19 wherein said first voltage ramp signal has a first time constant curve and said second voltage ramp signal has a second time constant curve, with said first time constant curve being more steep than said second time constant curve.

* * * * *